(12) United States Patent
Tsai et al.

(10) Patent No.: US 8,848,339 B2
(45) Date of Patent: Sep. 30, 2014

(54) CAPACITOR AND MANUFACTURING METHOD THEREOF

(75) Inventors: Hsieh-Ho Tsai, Kaohsiung (TW); Yu-Lin Hsin, Tainan (TW); Yu-Ming Lin, Tainan (TW); Li-Key Chen, Taipei (TW); Mei-Hua Wang, Miaoli County (TW); Chih-Kuang Chang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 151 days.

(21) Appl. No.: 13/615,650

(22) Filed: Sep. 14, 2012

(65) Prior Publication Data

US 2013/0155578 A1    Jun. 20, 2013

(30) Foreign Application Priority Data

Dec. 15, 2011 (TW) ............................ 100146543 A
Jun. 8, 2012 (TW) ............................ 101120686 A

(51) Int. Cl.
*H01G 9/00* (2006.01)
*H01G 9/145* (2006.01)

(52) U.S. Cl.
USPC ............ 361/502; 361/503; 361/508; 361/516

(58) Field of Classification Search
CPC ......... H01G 9/004; H01G 9/16; H01G 9/035; H01G 9/038; H01G 9/145
USPC .................. 361/502, 503, 508, 516
See application file for complete search history.

(56) References Cited

U.S. PATENT DOCUMENTS 5,659,457 A * 8/1997 Lian et al. ................. 361/502

| 6,356,432 B1 | 3/2002 | Danel et al. |
| 6,665,169 B2 | 12/2003 | Tennent et al. |
| 7,061,749 B2 | 6/2006 | Liu et al. |

(Continued)

FOREIGN PATENT DOCUMENTS

| CN | 101702379 | 5/2010 |
| CN | 101847514 | 9/2010 |

(Continued)

OTHER PUBLICATIONS

Lota et al., "Effect of nitrogen in carbon electrode on the supercapacitor performance," Chemical Physics Letters 404, Mar. 7, 2005, pp. 53-58.

(Continued)

*Primary Examiner* — Jayprakash N Gandhi
*Assistant Examiner* — Dion R Ferguson
(74) *Attorney, Agent, or Firm* — Jianq Chyun IP Office

(57) ABSTRACT

A capacitor and a manufacturing method thereof are provided. Two electrodes are disposed opposite to each other. Two electrode protection layers are respectively disposed on inner sides of the electrodes and include carbon particles each covered and bonded with a polymer shell. Active carbon layers are disposed on opposite inner sides of the electrode protection layers. The separator is disposed between the active carbon layers. The electrolyte fills between the electrode protection layers. The polymer shells of each electrode protection layer are bonded to the surface of the corresponding electrode by first and second functional groups. The first functional groups include thiol groups. The second functional groups include epoxy groups or carboxylic groups. The electrode protection layers serve as adhesion layers between the active carbon layers and the electrodes, and protect the electrodes from being corroded by the acid electrolyte solution.

9 Claims, 4 Drawing Sheets

(56) References Cited

U.S. PATENT DOCUMENTS

| | | | |
|---|---|---|---|
| 7,167,354 B2 | 1/2007 | Dietz et al. | |
| 7,466,539 B2 | 12/2008 | Dementiev et al. | |
| 7,745,528 B2 | 6/2010 | Prud'Homme et al. | |
| 7,799,471 B2 * | 9/2010 | Lee et al. | 429/347 |
| 7,931,969 B2 | 4/2011 | Lin | |
| 2003/0068550 A1 * | 4/2003 | Naoi et al. | 429/213 |
| 2006/0098389 A1 | 5/2006 | Liu et al. | |
| 2006/0251970 A1 * | 11/2006 | Lee et al. | 429/313 |
| 2008/0218938 A1 * | 9/2008 | Kazaryan et al. | 361/502 |
| 2009/0035623 A1 | 2/2009 | Tsuji | |
| 2009/0189129 A1 | 7/2009 | Lin | |
| 2009/0294081 A1 | 12/2009 | Gadkaree et al. | |
| 2010/0008021 A1 | 1/2010 | Hu et al. | |
| 2010/0129558 A1 | 5/2010 | Yagi et al. | |
| 2010/0136256 A1 | 6/2010 | Hwang et al. | |
| 2010/0163783 A1 | 7/2010 | Fung et al. | |
| 2011/0133132 A1 | 6/2011 | Zhamu et al. | |

FOREIGN PATENT DOCUMENTS

| | | |
|---|---|---|
| EP | 1027716 | 8/2000 |
| FR | 2867600 | 9/2005 |
| JP | 2005-305993 | 11/2005 |
| KR | 10-1046895 | 1/2007 |
| KR | 101031227 | 4/2011 |
| KR | 20110040027 | 4/2011 |
| TW | 516051 | 1/2003 |
| TW | 200505810 | 2/2005 |
| TW | I259211 | 8/2006 |
| TW | 200724485 | 7/2007 |
| TW | 201020301 | 6/2010 |
| TW | M403877 | 5/2011 |
| WO | 2008154691 | 12/2008 |
| WO | 2010088186 | 8/2010 |
| WO | 2010120560 | 10/2010 |

OTHER PUBLICATIONS

Kim et al., "Electrochemical Characterization of Solid-State Electric Double Layer Capacitors assembled with Sulfonated Poly (ether ether ketone)," 207th ECS Meeting Abstracts, May 17, 2005, pp. 164.
Sopčić et al., "Use of Polymers and their Composites with Ruthenium Oxide as Active Electrode Materials in Electrochemical Supercapacitors," POLIMERI 31, Jul. 2010, pp. 8-13.
Okajima et al., "Capacitance Properties of C60-loaded Activated Carbon Electrodes for High Power Electrochemical Supercapacitor," 206th ECS Meeting Abstracts, Oct. 2004, pp. 637.
Dikin et al., "Preparation and characterization of graphene oxide paper," Nature 448, Jul. 26, 2007, pp. 457-460.
Lei et al., "Intercalation of mesoporous carbon spheres between reduced graphene oxide sheets for preparing high-rate supercapacitor electrodes," Energy and Environmental Science 4, Apr. 9, 2011, pp. 1866-1873.
Chen et al., "Electrochemical and capacitive properties of polyaniline-implanted porous carbon electrode for supercapacitors," Journal of Power Sources 117, May 15, 2003, pp. 273-282.
Hanzelka et al., "Thermal radiative properties of a DLC coating," Cryogenics 48, Sep.-Oct. 2008, pp. 455-457.
Eriksson et al., "Surface Coating for Radiative Cooling Applications: Silicon Dioxide and Silicon Nitride Made by Reactive rf-Sputtering," Solar Energy Materials 12, Nov. 1985, pp. 319-325.
Suryawanshi et al., "Radiative Cooling: Lattice Quantization and Surface Emissivity in Thin Coatings," ACS Applied Materials & Interfaces 1 (6), May 27, 2009, pp. 1334-1338.
Nilsson et al., "Radiative cooling during the day: simulations and experiments on pigmented polyethylene cover foils," Solar Energy Materials and Solar Cells 37 (1), Apr. 1, 1995, pp. 93-118.
Dobson et al., "Thin semiconductor films for radiative cooling applications," Solar Energy Materials & Solar Cells 80 (3), Nov. 1, 2003, pp. 283-296.

* cited by examiner

CAPACITOR AND MANUFACTURING METHOD THEREOF

CROSS-REFERENCE TO RELATED APPLICATION

This application claims the priority benefits of Taiwan application serial no. 100146543, filed on Dec. 15, 2011 and Taiwan application serial no. 101120686, filed on Jun. 8, 2012. The entirety of each of the above-mentioned patent applications is hereby incorporated by reference herein and made a part of this specification.

BACKGROUND

1. Technical Field

The technical field relates to a capacitor and a manufacturing method thereof.

2. Background

In recent years, the rapid development of economy and the increasing nuclear risk result in urgent need to resolve the issue of energy shortage. Besides, as the consciousness of environmental protection gradually rises, people are eager for clean renewable energy, thus advancing the development of solar energy, wind power generation, and electricity for powering electric vehicles. Even though the clean natural renewable energy is inexhaustible, the natural energy input to a device in an inconstant manner leads to the disadvantage of non-linear output. Accordingly, how to efficiently store the energy has become one of the most popular research topics.

A capacitor is revolutionary in the field of energy storage. In particular, the capacitor is an electrochemical device in which electrical charges are stored on the electrode in a manner of the electric double layer through a porous carbon material having high specific surface area and extreme small distance between two electrodes.

A common capacitor is mainly composed of porous active carbon, electrodes, a separator, and an electrolyte. Devices are charged by a direct-current (DC) power source, such that the electric energy can be directly stored in form of static charges on surfaces of the electrodes. Hence, the capacitor having high capacitance must have large specific surface area.

Since the electrodes pose a direct impact on the quality of the capacitor, research and development of electrodes are rather crucial.

SUMMARY OF THE INVENTION

One of exemplary embodiments comprises a capacitor that includes two electrodes disposed opposite to each other; two electrode protection layers respectively disposed on opposite inner sides of the electrodes, the electrode protection layers including carbon particles each covered and bonded with a polymer shell; two active carbon layers respectively disposed on opposite inner sides of the electrode protection layers; a separator disposed between the active carbon layers; and an electrolyte filling space between the two electrode protection layers. The polymer shells of the electrode protection layers are bonded to surfaces of the electrodes through first and second functional groups, the first functional groups include thiol groups, and the second functional groups include epoxy groups or carboxylic groups.

One of exemplary embodiments comprises a manufacturing method of a capacitor including the following steps. Two electrodes are provided. An electrode protection layer is formed on a surface of each of the electrodes, and the electrode protection layers include carbon particles each covered and bonded with a polymer shell. An active carbon layer is formed on a surface of each of the electrode protection layers, wherein the surface of each of the electrode protection layers is not opposite to the electrode. The two electrodes are placed opposite to each other, such that the active carbon layers are located on respective inner sides of the two electrodes. A separator is placed between the active carbon layers. An electrolyte is injected between the electrode protection layers. The method of forming the electrode protection layers includes: respectively performing a surface treatment step on the surface of each of the electrodes, so as to generate first functional groups on the surface of each of the electrodes, the first functional groups comprising thiol groups; grafting polymer chains onto surfaces of the carbon particles to form modified carbon particles, the polymer chains having second functional groups, the second functional groups comprising epoxy groups or carboxylic groups; covering the treated surfaces of the electrodes with the modified carbon particles; and adding a cross-linking agent to the surfaces of the carbon particles and carrying out a cross-linking reaction to form the electrode protection layer on each of the electrodes.

One of exemplary embodiments comprises a manufacturing method of a capacitor including the following steps. Two electrodes are provided. An electrode protection layer is formed on one surface of each of the electrodes. The electrode protection layers include carbon particles each covered and bonded with a polymer shell. An active carbon layer is formed on a surface of each of the electrode protection layers, wherein the surface of each of the electrode protection layers is not opposite to the electrode. The two electrodes are placed opposite to each other, such that the active carbon layers are located on respective inner sides of the two electrodes. A separator is placed between the active carbon layers. An electrolyte is injected between the electrode protection layers. The method of forming the electrode protection layers includes the following steps. Polymer chains are grafted onto surfaces of the carbon particles to form modified carbon particles. The polymer chains have first and second functional groups, the first functional groups include epoxy groups or carboxylic groups, and the second functional groups include thiol groups. The one surface of each of the electrodes is covered with the modified carbon particles. A cross-linking agent is added to the surfaces of the carbon particles and a cross-linking reaction is carried out to form the electrode protection layer on each of the electrodes.

Several exemplary embodiments accompanied with figures are described in detail below to further explain the disclosure.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EXEMPLARY EMBODIMENTS

FIG. 1A to FIG. 1F are schematic cross-sectional views illustrating a manufacturing method of a capacitor according to an embodiment of the disclosure.

Figure 1A:
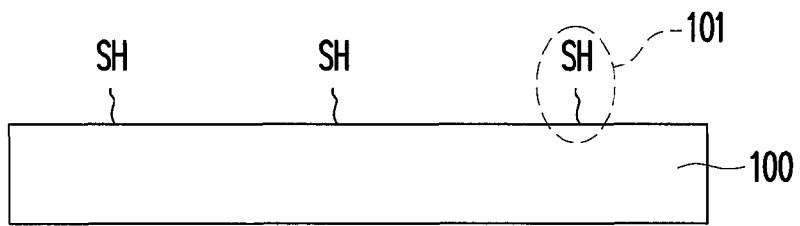
FIG. 1A to FIG. 1F are schematic cross-sectional views illustrating a manufacturing method of a capacitor according to an embodiment of the disclosure.

With reference to FIG. 1A, a surface treatment step is performed on an electrode (or referred to as a current collector) 100, so as to generate a plurality of functional groups 101 on a surface of the electrode 100. The 100 is made of stainless steel, aluminum, copper, gold, silver, nickel, titanium, or an alloy thereof, for instance. The surface treatment step is performed on the surface of the electrode 100 with use of thiol-containing organic acid or thiol-containing organic amine, for instance. The functional groups 101 are thiol groups (—SH), for instance.

Figure 1B:
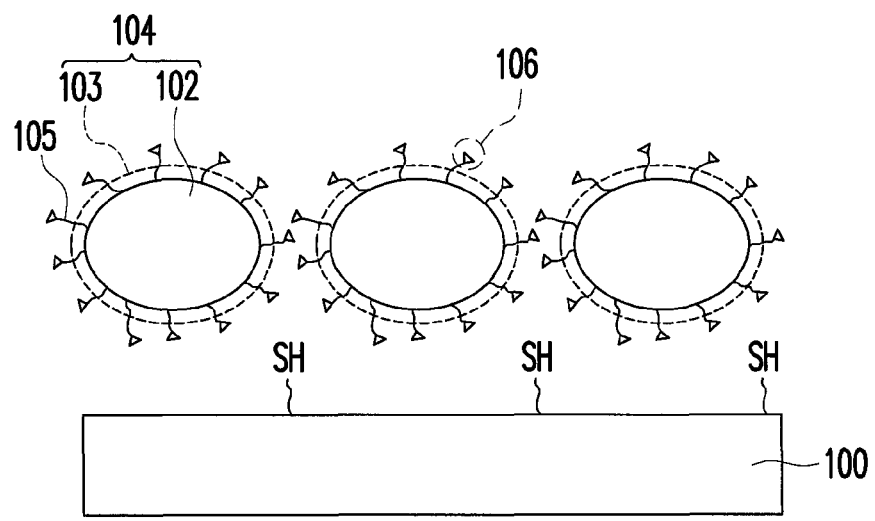

With reference to FIG. 1B, the surface of the electrode 100 is covered with a plurality of carbon particles 102 each covered and bonded with a polymer shell 103. A method of covering the surface of the electrode 100 includes spin-coating, spray, blade coating, or immersion, for instance. Each of the carbon particles 102 covered and bonded with the polymer shell 103 may be considered as a modified carbon particle 104. Each of the polymer shells 103 has a plurality of functional groups 106. The carbon particles 102 include active carbon, carbon nano-tubes, diamond particles, graphite powder, carbon black, carbon fibers, graphenes, or a mixture thereof. Besides, the carbon particles 102 account for about 85 wt % to about 97 wt % of the modified carbon particles 104. Namely, the carbon particles 102 account for about 85 wt % to about 97 wt % of each electrode protection layer 108 which is subsequently formed.

In addition, each of the polymer shells 103 includes a plurality of polymer chains 105. A weight-average molecular weight of each of the polymer chains 105 ranges from about 50,000 to about 150,000. The functional groups 106 in the polymer chains 105 include epoxy groups or carboxylic groups (—COOH). That is to say, each of the polymer chains 105 includes epoxy-containing polymer or carboxyl-containing polymer. The epoxy-containing polymer includes polyglycidyl methacrylate (PGMA) or poly 2-(4-vinylphenyl)oxirane, for instance. The carboxyl-containing polymer includes polyacrylic acid, for instance.

Besides, the functional groups 106 in the polymer chains 105 may be the same or different. According to an embodiment of the disclosure, the polymer shells 103 include either epoxy-containing polymer or carboxyl-containing polymer. According to another embodiment of the disclosure, the polymer shells 103 include both epoxy-containing polymer and carboxyl-containing polymer.

Figure 1C:
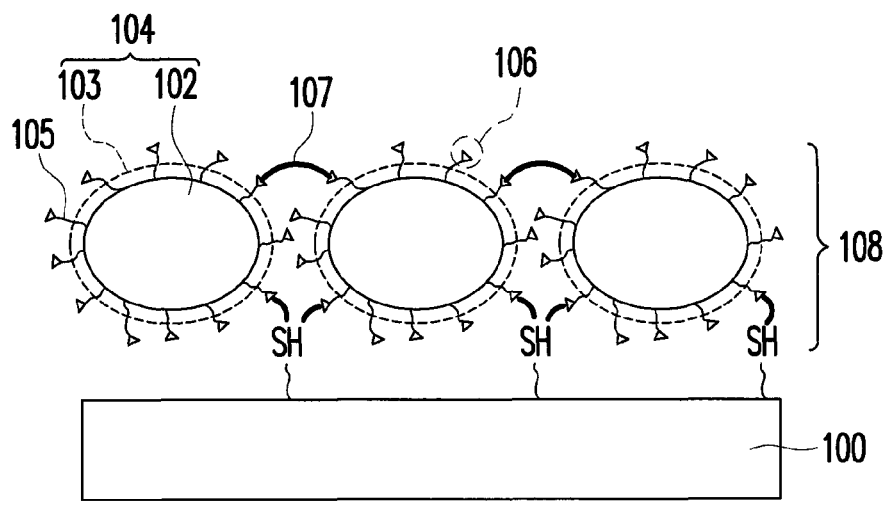

With reference to FIG. 1C, a cross-linking agent is added to surfaces of the modified carbon particles 104, and the electrode 100 is heated to carry out a cross-linking reaction, such that an electrode protection layer 108 is formed on the electrode 100. To be more specific, the cross-linking reaction results in the cross-linking phenomenon among parts of the functional groups 106 and the cross-linking phenomenon between the functional groups 101 and another parts of the functional groups 106, so as to form the electrode protection layer 108 on the electrode 100. In FIG. 1C, the lines in bold print represent the cross-linking phenomenon 107. By applying the above-mentioned method of forming the electrode protection layer 108, the electrode protection layer 108 can be fixed to the surface of the electrode 100 without employing any adhesive.

According to the method of forming the electrode protection layer on the surface of the electrode described in the previous embodiment, the carbon particles having epoxy-containing or carboxyl-containing polymer can be coated onto the surface of the electrode having thiol groups, and self-assembly coated on the surface of the electrode through the cross-linking reaction. Nevertheless, the disclosure should not be construed as limited to the embodiment set forth herein.

Figure 2A:
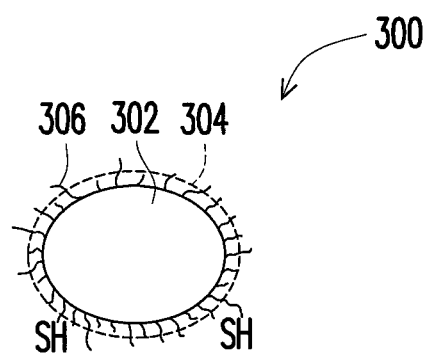
FIG. 2A and FIG. 2B are schematic cross-sectional views illustrating a method of manufacturing an electrode protection layer on an electrode according to an embodiment of the disclosure.

According to another embodiment, the polymer shells on the surfaces of the carbon particles may have the epoxy groups or the carboxylic groups for self cross-linking and the thiol groups for adsorbing on the surfaces of the electrodes, and the electrodes are then covered by the carbon particles. Specifically, with reference to FIG. 2A, a plurality of polymer chains is grafted onto the surface of a carbon particle 302, and each of the polymer chains has a first functional group for self cross-linking. The first functional groups include epoxy groups or carboxylic groups. When the first functional groups include the epoxy groups, each of the polymer chains may be polyglycidyl methacrylate (PGMA) or poly 2-(4-vinylphenyl)oxirane, for instance. When the first functional groups include the carboxylic groups, each of the polymer chains may be polyacrylic acid, for instance. Parts of the first functional groups in the polymer chains are replaced by second functional groups for absorbing on the surface of the electrode 100, so as to form a modified carbon particle 300. The second functional groups include thiol groups.

Figure 2B:
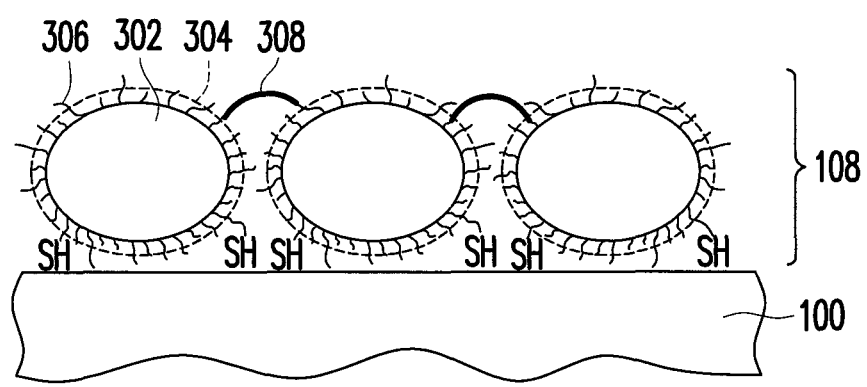

With reference to FIG. 2B, the surface of the electrode 100 is covered with a plurality of the modified carbon particles 300. The electrode 100 may be metal that includes aluminum, aluminum-magnesium alloy, copper, or stainless steel. A method of covering the surface of the electrode 100 includes spin-coating, spray, blade coating, or immersion. After that, a method of forming the electrode protection layer 108 on the electrode 100 includes adding a cross-linking agent to the surface of the electrode 100 and heating the electrode 100 to carry out a cross-linking reaction. The carbon particles 302 account for about 85 wt % to about 97 wt % of the electrode protection layer 108.

Figure 1D:
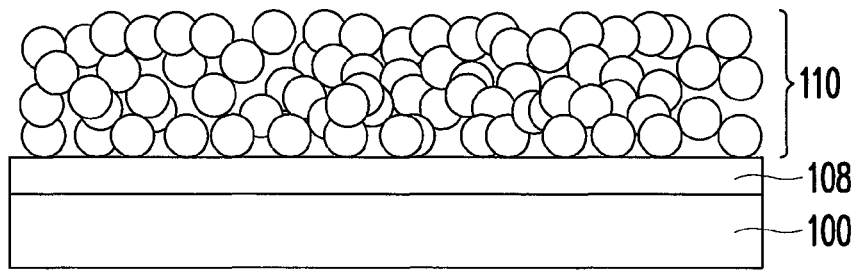

With reference to FIG. 1D, the electrode protection layer 108 is covered with an active carbon layer 110. That is, the active carbon layer 110 is formed on a surface of the electrode protection layer 108, wherein the surface of the electrode protection layer 108 is not opposite to the electrode 100. Diameters of pores in the active carbon layer 110 may range from about 2 nm to about 50 nm, or from about 2 nm to about 25 nm. The diameters of pores in the active carbon layer 110 may be the same as or different from one another, and the active carbon particles with small pores (smaller than 2 nm), middle pores (greater than 2 nm and smaller than 50 nm), and large pores (greater than 50 nm) may be mixed. In addition, the specific surface area of the carbon particles in the active carbon layer 110 may range from about 20 $m^2/g$ to about 2,600 $m^2/g$, or from about 1,200 $m^2/g$ to about 2,000 $m^2/g$.

After the electrode 100 having the electrode protection layer 108 and the active carbon layer 110 is formed, another electrode 200 having an electrode protection layer 208 and an active carbon layer 210 both formed by applying the aforesaid method is provided. To simplify the manufacturing process, the electrode protection layer 208, the active carbon layer 210, and the electrode 200 may be the same as the electrode protection layer 108, the active carbon layer 110, and the electrode 100. Nevertheless, the disclosure should not be construed as limited to the embodiment set forth herein. It is known to people having ordinary skill in the art that the materials or the thickness of the electrode protection layer 108, the active carbon layer 110, and the electrode 100 may be different from the materials or the thickness of the electrode protection layer 208, the active carbon layer 210, and the electrode 200 according to the design requirement.

Figure 1E:
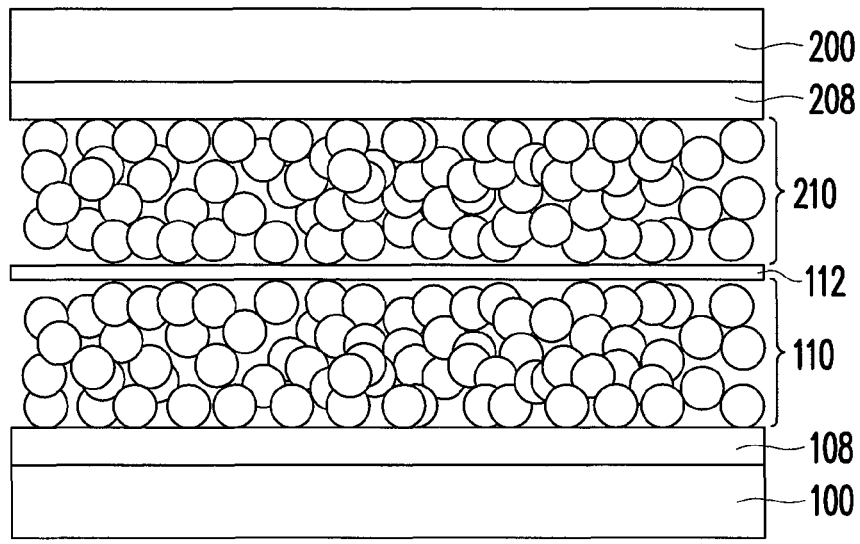

With reference to FIG. 1E, a separator 112 is placed between the electrode 100 and the electrode 200, wherein the separator 112 is placed between the active carbon layer 108 and the active carbon layer 208. Here, the separator 112 is a polymer membrane capable of transmitting ions and is made of cellulose, Nylon, PVDF, polypropylene in form of nonwoven fabric, or polyethylene in form of nonwoven fabric, for instance.

Figure 1F:
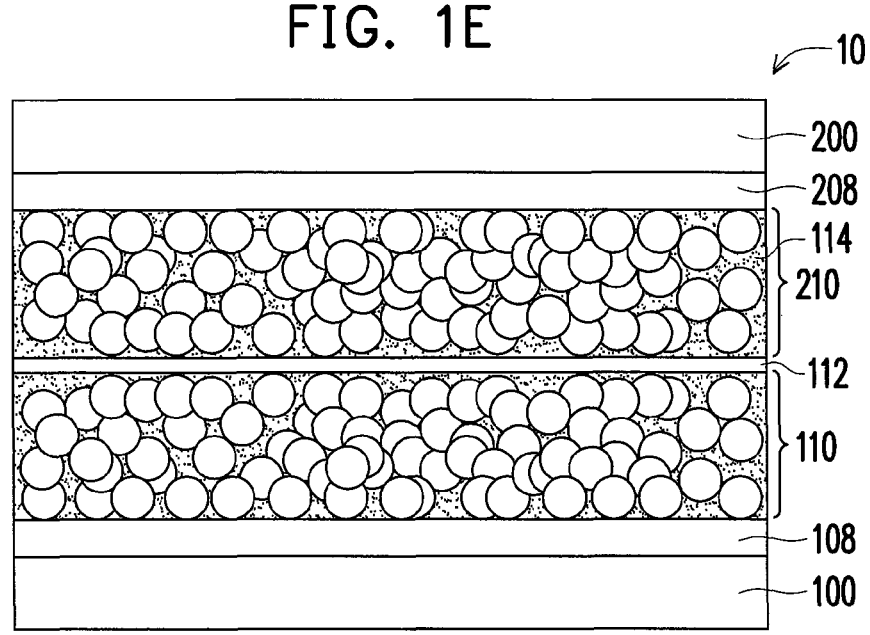

With reference to FIG. 1F, an electrolyte 114 is injected between the electrode protection layer 108 and the electrode protection layer 208. The electrolyte 114 infiltrates into the active carbon particles of the active carbon layers 110 and 210. Here, the electrolyte 114 is the 1M TEABF4/PC electrolyte solution (brand name, purchased from Fluka), for instance. The preparation of the capacitor 10 is thus completed.

The structure of the capacitor is described hereinafter with reference to FIG. 1C and FIG. 1F. In the disclosure, the capacitor 10 includes the electrodes 100 and 200, the electrode protection layers 108 and 208, the active carbon layers 110 and 210, the separator 112, and the electrolyte solution 114. The surface of each of the electrodes 100 and 200 respectively has the functional groups 101. The electrodes 100 and 200 are disposed opposite to each other. The electrode protection layers 108 and 208 are respectively disposed on opposite inner sides of the electrodes 100 and 200. Here, each of the electrode protection layers 108 and 208 includes the carbon particles 102 each covered and bonded with a polymer shell 103, and each of the polymer shells 103 has the functional groups 106. The functional groups 101 and parts of the functional groups 106 are bonded through the cross-linking reaction. Namely, the polymer shells 103 of the electrode protection layer 108 are bonded to the surface of the electrode 100 through the functional groups 101 and 106. Similarly, the polymer shells 103 of the electrode protection layer 208 are bonded to the surface of the electrode 200 through the functional groups 101 and 106. The separator 112 is disposed between the electrode protection layers 108 and 208. The active carbon layer 110 is disposed between the separator 112 and the electrode protection layer 108. The active carbon layer 210 is disposed between the separator 112 and the electrode protection layer 208. The electrolyte 114 fills the space between the electrode protection layers 108 and 208.

The structure of the capacitor is described hereinafter with reference to FIG. 2B and FIG. 1F. In the disclosure, the capacitor 10 includes the electrodes 100 and 200, the electrode protection layers 108 and 208, the active carbon layers 110 and 210, the separator 112, and the electrolyte solution 114. The electrodes 100 and 200 are disposed opposite to each other. The electrode protection layers 108 and 208 are respectively disposed on opposite inner sides of the electrodes 100 and 200. Here, each of the electrode protection layers 108 and 208 includes the carbon particles 304 each covered and bonded with a polymer shell 304, and each of the polymer shells 304 has a plurality of first functional groups for self cross-linking and a plurality of second functional groups for adsorbing on a surface of each electrode. Here, the first functional groups include epoxy groups or carboxylic groups, the second functional groups include thiol groups, and parts of the first functional groups are bonded and cross-linked. Namely, the polymer shells 304 of the electrode protection layers 108 and 208 are respectively bonded to the surfaces of the electrodes 100 and 200 through cross-linking based on the first and second functional groups. Each of the polymer shells 304 includes a plurality of polymer chains. Parts of the polymer chains include partially-thiolated PGMA, partially-thiolated poly 2-(4-vinylphenyl)oxirane, or partially-thiolated polyacrylic acid, and another parts of the polymer chains include PGMA, poly 2-(4-vinylphenyl)oxirane, or polyacrylic acid. The separator 112 is disposed between the electrode protection layers 108 and 208. The active carbon layer 110 is disposed between the separator 112 and the electrode protection layer 108. The active carbon layer 210 is disposed between the separator 112 and the electrode protection layer 208. The electrolyte 114 fills the space between the electrode protection layers 108 and 208.

In the capacitor described herein, the carbon particles with middle pores can be applied, so as to increase the contact area between the active carbon layers and the electrolyte and further enhance the charge storage capacity.

From another perspective, the electrode protection layers are disposed on the surfaces of the electrodes; therefore, the electrolyte is not in contact with the electrodes to result in the chemical corrosion reaction. As such, the interface impedance does not increase, and the charge storage capacity does not decrease.

Several examples and comparative examples are provided below to illustrate the effects achieved in the disclosure Example 1

(1) Formation of Electrodes Having Active Carbon Layers and Protection Layers

Electrode Surface Treatment

Aluminum foil was dipped into a buffered oxide etch solution (brand name: buffered oxide etch 6:1, purchased from J. T. Baker) for about 0.5 minute to about 10 minutes to remove the metal oxide layer on the surface of the aluminum foil, and the aluminum foil was then moved into water, cleaned, and dried. After that, the aluminum foil was dipped into 3-mercaptopropionic acid for about 0.5 minute to about 10 minutes, taken out and cleaned by tetrahydrofuran, and dried.

Preparation of Modified Carbon Particles 1,000 mesh of graphite powder was weighed and added to a beaker. 100 ml of dimethylsulfoxide and 100 ml of monomer solution of glycidyl methacrylate (GMA) were mixed and added to the beaker, and 10 g of benzoyl peroxide (BPO) was gradually added thereto. A polymerization reaction of the monomer solution with the added BPO was carried out at 80° C. under ultrasonic, such that a portion of the polymer radicals were directly grafted onto the graphite powder. Thereafter, the graphite powder grafted with polymer (or called PGMA grafted graphite powder) in the solution were isolated by high-speed centrifugation and free polymer was removed.

Formation of Electrode Protection Layer

The PGMA grafted graphite powder was dispersed in methyl ethyl ketone and diluted to a concentration of 0.1 wt % to 10 wt %. Besides, the aluminum foil was done with an adequate surface treatment and then dried, and a graphite powder film was deposited on the surface of the aluminum foil by immersion or spraying. After the aluminum foil with the deposited graphite powder film was dipped in an ethylenediamine solution with the concentration of 0.5% to 5%, a baking process was performed at 60° C. to 100° C. to allow parts of the epoxy groups of the polymer shells covering the graphite powder to cross-link with each other, and to allow another parts of the epoxy groups of the graphite powder to cross-link with the 3-mercaptopropionic acid absorbed on the surface of the aluminum foil. Therefore, a graphite powder film as a composite carbon material layer was formed on the surface of the aluminum foil.

Formation of Active Carbon Layer

Porous active carbon particles (with the diameter smaller than 1 μm) were dispersed in 1 ml of anhydrous ethanol, and the said solution was dripped on a filter paper (1 cm×1 cm). A gas extraction process and a filtering process were then performed to form a porous carbon paper. The porous carbon paper was adhered to the composite carbon material layer. Alternatively, the active carbon particles were sprayed onto the composite carbon material layer and placed into an oven at 80° C., such that the composite carbon material layer and the active carbon layer were reacted and bonded completely.

(2) Assembly of Capacitor

The two electrodes each having the active carbon layer and the protection layer were disposed opposite to each other, such that the two active carbon layers were located on inner sides of the two electrodes, and a separator was placed between the two active carbon layers. Here, the separator was made of cellulose (trade name: TF-40). The two electrodes were wrapped by a filter paper, sandwiched by two Teflon clips, and screwed by plastic screws with a torque of 0.7 kgf·cm. After 20 minutes, the 1M TEABF4/PC electrolyte (brand name, purchased from Fluka) was injected. After another 30 minutes, the electrolyte permeated into the pores of the active carbon layer. The capacitor of Example 1 was then obtained.

Example 2

A capacitor was formed by applying the same method described in the Example 1, whereas the aluminum foil was replaced by a stainless steel board serving as the electrodes. The capacitor of Example 2 was then obtained.

Example 3

In the Example 3, a surface modification process was performed on 1,000 mesh of graphite powder. With carbon $SP^2$ structure on the surface of the graphite powder, PGMA was directly grafted onto the graphite powder through radical polymerization. 10 g of graphite powder were dispersed in 100 ml of monomer solution of glycidyl methacrylate (GMA) under ultrasonic to completely disperse the graphite powder, and 10 g of benzoyl peroxide (BPO) as a radial initiator were gradually and constantly added thereto. A polymerization reaction of the monomer solution with the added BPO was carried out at 80° C. under ultrasonic, such that a portion of the polymer radicals were directly grafted onto the surface of the graphite powder. Thereafter, the graphite powder grafted with polymer (or called PGMA grafted graphite powder) in the solution were isolated by high-speed centrifugation and free polymer was removed.

10 g of the PGMA grafted graphite powder were dispersed in 100 ml of dimethyl sulfoxide, and 0.02 g of 0.2% 2-mercaptopropionic acid was then added to the solution. The whole solution was reacted at 50-100° C. for one hour, so that a ring-opening reaction was carried out between the epoxy groups of the PGMA grafted graphite powder and 2-mercaptopropionic acid. The epoxy groups of the polymer chains were reacted with 2-mercaptopropionic acid, so that a portion of the epoxy groups were replaced with thiol groups at ends of a portion of the polymer chains. The thiol groups on the surfaces of the graphite powder were bonded to the surface of an aluminum foil. After the aluminum foil was dipped in an ethylenediamine solution with the concentration of 0.5% to allow the epoxy groups on the surfaces of the graphite powder to cross-link with each other, a baking process was performed at 100° C. to complete the reaction. Therefore, a graphite powder film as an electrode protection layer was formed on the surface of the aluminum foil.

After that, the active carbon layer was formed and the capacitor was assembled in the manner described in Example 1. The capacitor of Example 3 was then obtained.

Comparative Example 1

A capacitor was formed by applying the same method described in Example 1, whereas no electrode protection layer (i.e., the composite carbon material layer) was formed on the aluminum foil. The capacitor of Comparative Example 1 was then obtained.

Comparative Example 2

In Comparative Example 2, the method of forming a conventional supercapacitor was applied. Specifically, a stainless steel board was coated with a mixture of porous active carbon particles (with the diameter smaller than 1 μm) and 5 wt % PVDF binding agent and then dried and shaped. Thereafter, a separator made of cellulose (trade name: TF-40) was placed between two of the stainless steel boards, and 1M TEABF4/PC electrolyte solution was injected between the two electrodes. The capacitor of Comparative Example 2 was then obtained.

Comparative Example 3

A capacitor was formed by applying the same method described in Comparative Example 2, whereas the 5 wt % PVDF binding agent was replaced by a 10 wt % PVDF binding agent. The capacitor of Comparative Example 3 was then obtained.

Comparative Example 4

A capacitor was formed by applying the same method described in Comparative Example 2, whereas the 5 wt % PVDF binding agent was replaced by a 20 wt % PVDF binding agent. The capacitor of Comparative Example 4 was then obtained.

Comparative Example 5

A capacitor was formed by applying the same method described in Comparative Example 2, whereas the 5 wt % PVDF binding agent was replaced by a 40 wt % PVDF binding agent. The capacitor of Comparative Example 5 was then obtained.

An electrochemical test, a charging-discharging test, and an alternating current (AC) impedance test were then performed on the capacitors provided in the above examples and comparative examples.

Electrochemical Test

The test was conducted on the following conditions: potential window ranged from −2V to 2V, scan speed was set to 5 mV/s, 10 mV/s, 20 mV/s, 50 mV/s, 100 mV/s, 200 mV/s, and 500 mV/s, and three cycles were performed at each scan speed. The area ratio obtained from the CV diagram was applied to calculate the capacitance.

Charging-Discharging Test

A charging process was performed at the speed of 1 mA/s, and a discharging process was then performed at different discharging speed, i.e., 1 mA/s, 2 mA/s, 4 mA/s, 9 mA/s, 19 mA/s, 30 mA/s, 40 mA/s, and 50 mA/s. Four experiments were carried out at each discharging speed to obtain the average. According to the operating conditions in an aqueous phase system, the capacitor was charged from 0V to 1V and discharged from 1V back to 0V; according to the operating conditions in an organic phase system, the capacitor was charged from 0V to 2V and discharged from 2V back to 0V.

AC Impedance Test

In a bipolar device system, the measurement was conducted when the AC voltage swing was 5 mV, and the frequency ranged from 100,000 Hz to 0.01 Hz. An impedance value and a phase angle were the obtained original data and converted into capacitance impedance Z" and resistance Z'. The Nyquist diagram was drawn thereby and applied to analyze the impedance value of each part.

In addition, the maximum capacitance of each of the capacitors described in the examples and the comparative examples and the adhesion of the active carbon layer are shown in Table 1.

TABLE 1

| | Electrode Protection Layer | Binding Agent (wt %) | Capacitance (F/g) | Adhesion of Active Carbon Layer |
|---|---|---|---|---|
| Example 1 | Yes | No | 186 | Good |
| Example 2 | Yes | No | 154 | Good |
| Example 3 | Yes | No | 117 | Good |
| Comparative Example 1 | No | No | 161 | Bad |
| Comparative Example 2 | No | 5 | 146 | Bad |
| Comparative Example 3 | No | 10 | 150 | Bad |
| Comparative Example 4 | No | 20 | 57 | Good |
| Comparative Example 5 | No | 40 | 69 | Good |

According to the results in Examples 1 and 2, in the event that the sprayed active carbon particles are used in replacement of the conventional polymer binding agent, the capacitance of each of the capacitors in Examples 1 and 2 is greater than 150 F/g regardless of whether the aluminum foil or the stainless steel board is used. Furthermore, the sample which has been done with the electrochemical property analysis is disassembled, and the metal electrode of the sample is bent at an angle of 180 degrees repeatedly. It is found that the composite carbon material layer still exhibits excellent adhesion and does not fall off.

Additionally, according to the results in Comparative Examples 1 to 5, the amount of the binding agent need be greater than 20 wt % in order to achieve satisfactory adhesion effects. However, it can be observed from the results in Comparative Examples 3 and 4 that the maximum capacitance is reduced from 150 F/g to 57 F/g as the amount of the polymer binding agent increases from 10 wt % to 20 wt %.

From another perspective, the maximum capacitance of the capacitor in Example 1 is 186 F/g, and the capacitance retention rate is 60% when the scan voltage is raised to 100 mV/s. By contrast, the maximum capacitance of the capacitor in Comparative Example 1 is 161 F/g, and the capacitance retention rate is 51% when the scan voltage is raised to 100 mV/s.

As such, it can be learned that the coating of the electrode protection layer described herein can increase the maximum capacitance and the capacitance retention rate.

Figure 3:
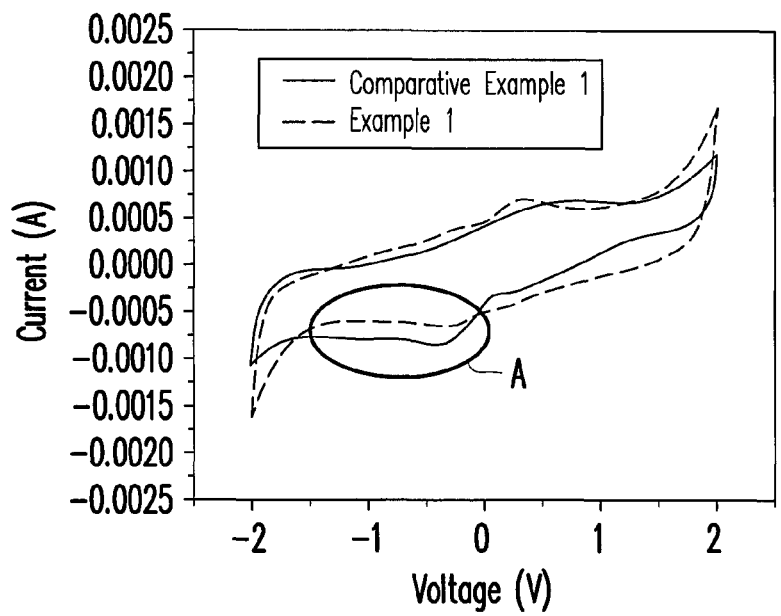
FIG. 3 is a current-voltage (CV) diagram according to Example 1 and Comparative Example 1.

FIG. 3 is a current-voltage (CV) diagram according to Example 1 and Comparative Example 1. With reference to FIG. 3, the aluminum foil without a carbon electrode protection layer is in physical contact with the electrolyte, which leads to irreversible corrosion as shown by the irreversible oxidation-reduction peak in the region A. On the contrary, the aluminum foil with a carbon electrode protection layer coated thereon is not in physical contact with the electrolyte, and thus the asymmetrical oxidation-reduction peak disappears. Thereby, the oxidation-reduction corrosion of the surfaces of the metal electrodes caused by the acid electrolyte solution can be mitigated. As a result, the carbon electrode protection layers described herein indeed protect the metal electrodes.

Figure 4:
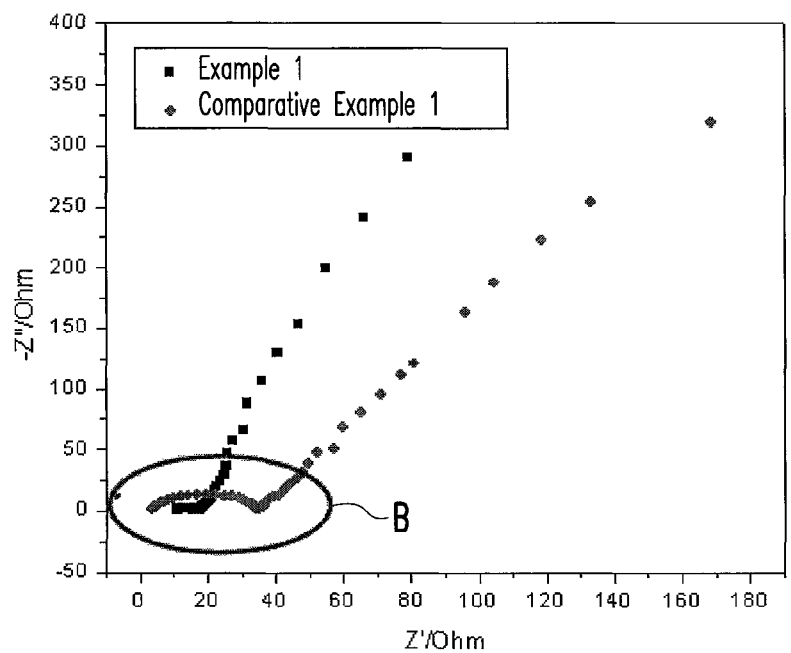
FIG. 4 is an electrochemical impedance spectroscopy (EIS) diagram according to Example 1 and Comparative Example 1.

FIG. 4 is an electrochemical impedance spectroscopy (EIS) diagram according to Example 1 and Comparative Example 1. The internal impedance of a device is determined based on the size of the semicircle in the high-frequency region of the EIS diagram, and it can be observed from the region B of FIG. 4 that the aluminum electrodes with the carbon protection layers coated thereon apparently have the reduced impedance. As indicated in the EIS diagram, the overall electrode impedance is reduced from 30 ohm to 5 ohm because the composite carbon material layer is coated between the active carbon layer and the aluminum foil.

In light of the foregoing, according to the manufacturing method of the capacitor in the disclosure, the adhesive (e.g., resin or polymer) is not required, and the carbon particles having epoxy-containing or carboxyl-containing polymer can still be coated onto the surfaces of the metal electrodes having thiol groups. Through the cross-linking reaction, the carbon material can be self-assembly coated on the surfaces of the metal electrodes. Alternatively, the polymer shells on the surfaces of the carbon particles may have the functional groups (epoxy groups/carboxylic groups) for self cross-linking and the functional groups (thiol groups) for adsorbing on a substrate surface, such that the carbon material can be self-assembly coated on the surfaces of the metal electrodes. As compared to the related art, the disclosure does not require the use of resin or polymer as an adhesive, and thus the large specific surface area and the conductive property of the carbon material are not significantly affected. In addition, the protection layers can be formed on the surfaces of the metal electrodes to prevent the metal electrodes from being corroded by the electrolyte solution. Moreover, the supercapacitor formed by applying the manufacturing method described herein can have relatively large capacitance and favorable stability.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A capacitor comprising:
    two electrodes disposed opposite to each other;
    two electrode protection layers respectively disposed on opposite inner sides of the electrodes, the electrode protection layers comprising carbon particles each covered and bonded with a polymer shell;
    two active carbon layers respectively disposed on opposite inner sides of the electrode protection layers;
    a separator disposed between the active carbon layers; and an electrolyte filling space between the two electrode protection layers, wherein the polymer shells of the electrode protection layers are bonded to surfaces of the electrodes through first and second functional groups, the first functional groups comprise thiol groups, and the second functional groups comprise epoxy groups or carboxylic groups.

2. The capacitor as recited in claim 1, wherein the polymer shells of each of the electrode protection layers are bonded to the surface of one of the electrodes through cross-linking based on the first and second functional groups.

3. The capacitor as recited in claim 1, wherein the first functional groups are bonded to the surfaces of the electrodes.

4. The capacitor as recited in claim 1, wherein the polymer shells have the second functional groups.

5. The capacitor as recited in claim 1, wherein the polymer shells have the first and second functional groups.

6. The capacitor as recited in claim 1, wherein each of the polymer shells comprises a plurality of polymer chains, and a weight-average molecular weight of each of the polymer chains ranges from about 50,000 to about 150,000.

7. The capacitor as recited in claim 6, wherein each of the polymer chains comprises polyglycidyl methacrylate, poly 2-(4-vinylphenyl)oxirane, or polyacrylic acid.

8. The capacitor as recited in claim 1, wherein the carbon particles comprise active carbon, carbon nano-tubes, diamond particles, graphite powder, carbon black, carbon fibers, graphenes, or a mixture thereof.

9. The capacitor as recited in claim 1, wherein the carbon particles account for about 85 wt % to about 97 wt % of each of the electrode protection layers.

* * * * *